March 22, 1932.  C. SAURER  1,850,289
NONMETALLIC CONNECTION
Filed Jan. 7, 1928
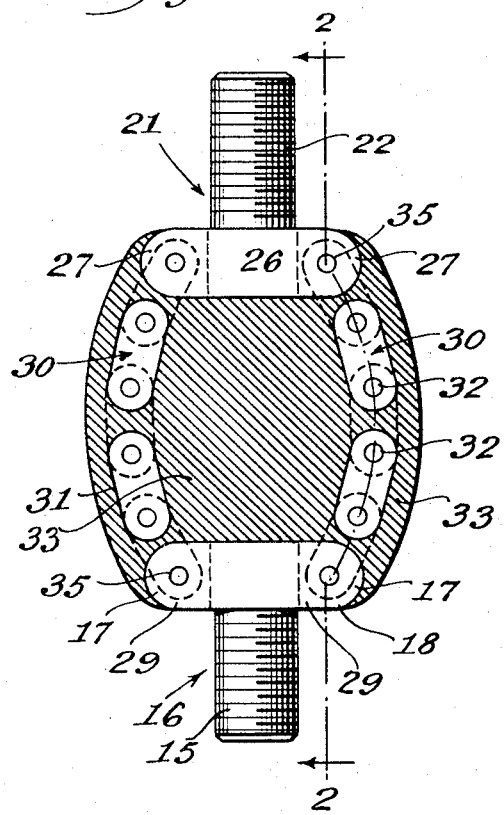
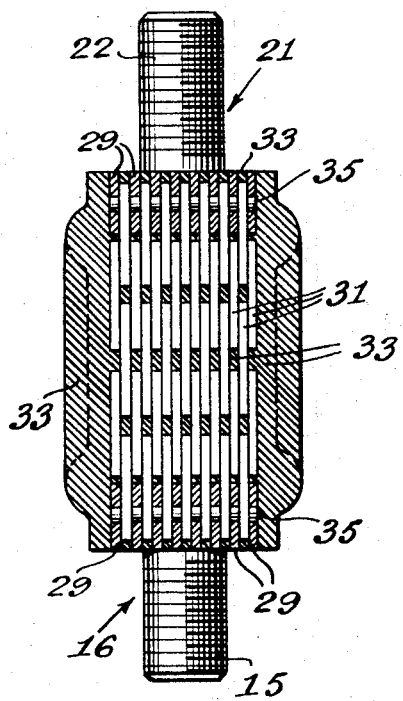
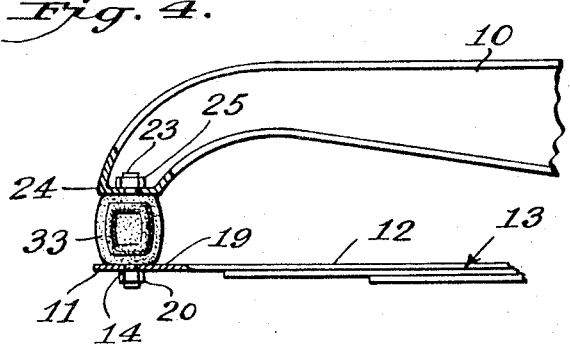
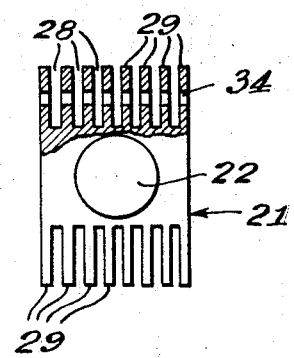
INVENTOR
Curt Saurer
BY
ATTORNEY Patented Mar. 22, 1932

1,850,289

UNITED STATES PATENT OFFICE

CURT SAURER, OF CLEVELAND, OHIO, ASSIGNOR TO THE MECHANICAL RUBBER COMPANY, OF CLEVELAND, OHIO, A CORPORATION OF NEW JERSEY

NONMETALLIC CONNECTION

Application filed January 7, 1928. Serial No. 245,139.

This invention relates to cushion connections or shackles for vehicle springs and particularly to those employing a non-metallic insulating medium between the springs and the chassis frame.

The invention has wide application as a shock insulator or non-vibration transmitting connection for use between any relatively movable parts, but it will have particular adaptation as a shock insulator between the springs of motor vehicles and the chassis frame. Heretofore, various forms of metal-to-metal connections have been used at this point with the result that in a comparatively short space of time the connections became loose and noisy due to the accumulation of abrasives and lack of proper lubrication at the surfaces of the moving parts, and this not infrequently resulted in breakage, with consequent danger to passengers. Furthermore, the high frequency vibrations set up in the various metal-to-metal parts causes crystallization which has a weakening effect on the whole structure of the spring suspension.

It is proposed in this invention to overcome the foregoing disadvantages and provide a shock insulating and vibration-dampening connection incorporating flexibility in all directions in a single plane corresponding to the vertical and the lengthwise motions of the spring or the resultants of such motions, due to vibration and deflection, and being substantially inflexible in a direction at right angles to said plane of motion so as to prevent side sway of the vehicle.

Another object of this invention is to dispense with lubrication, to simplify attachment to the frame, and to do away with spring eyes or any other forming operations on the spring.

One practical form of the invention consists in attaching an element to the chassis frame and another similar element to the end of the spring, the two elements being connected by flexible means such as a link chain or belt and the whole assembly embedded in a non-metallic vibration-insulating material, such as rubber, and then vulcanized in a mold so that the assembled parts assume the form of a self-contained unit which is easily attachable to the spring and the frame. The rubber is arranged in a manner to normally maintain the linkage in flexed condition, which allows the rubber a comparatively free range of flow in the vertical and longitudinal directions, while the stiffness of the linkage in a lateral direction holds the two elements against relative side-wise motion. Furthermore, the rubber contributes a retarding or restraining action to the spring motion and thereby prevents excessive deflection thereof.

Other objects and advantages will appear as the description proceeds.

In the accompanying drawings:

Fig. 1 is a vertical section through the shackle embodying my invention;

Fig. 2 is a transverse section on the line 2—2 of Fig. 1;

Fig. 3 is a detail view of one of the parts of the shackle; and

Fig. 4 illustrates one practical application of the shackle.

Referring now to the drawings, the reference character 10 indicates the end of the chassis frame of a vehicle to which the end 11 of the main leaf 12 of a spring 13 is to be secured. Heretofore, the spring leaf 12 has been formed with an eye and the frame 10 also equipped with a similar eye to receive pins for attachment of straps or links whereby to connect the spring to the frame. In this invention the eyes are dispensed with and the main spring leaf 12 is extended straight to the rear in flat form and provided with a single perforation 14 which is adapted to receive the threaded lug 15 of an element 16 preferably in the form of a T-shaped head, including oppositely disposed extensions 17. The element 16 preferably has a flat outer surface 18 adapted to be brought into frictional engagement with the upper surface 19 of the main spring leaf 12, the nut 20 being threaded onto the lug 15 to secure the element 16 firmly against the surface 19. In this way the element 16 is prevented from turning about the vertical axis of the lug 15 and is securely fastened to the end 11 of the leaf 12. An element designated 21 and similar to the element 16 is also equipped with a threaded lug 22 which is adapted to be received in a perforation 23 in the horizontal web portion 24 at the end of the chassis frame 10, a nut 25 being provided to secure the element 21 to the frame 10 in a similar manner, as described in connection with the element 16. The element 21 has a T-shaped head 26 including oppositely disposed extensions 27.

Referring with particularity to Fig. 3, it will be seen that the extensions 17 and 27 of the elements 16 and 21 are recessed as indicated at 28 so as to form a plurality of lugs 29. A pair of flexible elements such as chains 30 preferably in the form of a link belt having a plurality of links 31 pivoted together by means of pins 32, is adapted to connect the two elements 16 and 21 by means of pins 35 which pass through registering perforations 34 in the lugs 29 and perforations 35 adjacent the opposite ends of the chains 30. It is proposed to also connect the two elements 16 and 21 elastically to absorb vertical vibrations, while at the same time permitting longitudinal motion between the elements.

It is also desired to prevent lateral motion between said elements in order to prevent side sway of the vehicle frame with reference to the springs 13. The assembled parts, including the elements 16 and 21 and the chains 30, are completely embedded in a non-metallic elastic shock-absorbing material such as rubber 33. The rubber is preferably molded around the various parts so that it embeds and covers the metallic surfaces and thereby protects them from oxidation and the destructive action of abrasives. It will be noted from a consideration of Fig. 1 that the chains 30 are normally flexed in opposite directions, thereby permitting the elements 16 and 21 to move toward or away from each other in the vertical direction during spring deflection, and that the elements 16 and 21 may also move relatively to each other in the longitudinal direction, but that due to the stiffening action of the chain linkage, any tendency toward lateral motion between the elements is prevented. In the event of deterioration or even complete failure of the rubber, the spring 13 cannot become separated from the chassis 10, for the reason that the chain linkage 30 maintains a connection between the elements 16 and 21, thereby contributing to safety.

In manufacturing the shackle, the metallic parts are first assembled, then the rubber is applied in unvulcanized form so as to fill in all spaces and completely enclose the parts. The entire assembly is then placed in a mold and vulcanized. In this way the finished product assumes the form of a one-piece article in which the rubber and the chain linkage form a strong mechanical connection between the parts and in which the rubber also provides a protective covering for all the parts.

The chains 30 are shown as comprising a plurality of links 31 loosely pinned directly together. If desired and preferably, the links 31 of the chains may be spaced apart so as to reduce the number of parallel linkages and to facilitate the flow of rubber in the molding or vulcanizing operation and thereby produce a more satisfactory flexible connection or shackle for some purposes. In its broadest aspect the invention contemplates any suitable or desired spacing of the series of links with or without the use of collars or shouldered studs to control the spacing of the linkages and to govern the stiffness of the flexible connection against side-sway.

The invention is not limited to use as a shackle for vehicle suspension but may have wide application in any situation where it is desired to insulate any relatively movable parts against the transmission of shock or vibration, and to permit flexibility in a vertical and a longitudinal direction or combinations thereof, while being inflexible in a lateral direction.

Having thus described my invention what I claim and desire to protect by Letters Patent is:

1. A combined insulating and vibration-dampening device for connecting relatively movable parts, comprising a member adapted to be secured to one of said parts, a member adapted to be secured to another part, metallic linkage connected at opposite ends directly to said members, and vibration-dampening insulating material embedding said linkage and interposing said members, said linkage being arranged to permit relative motion of said members in one plane while holding said members against relative motion in a direction at right angles to said plane.

2. A combined insulating and vibration-dampening device for connecting relatively movable parts, comprising a member adapted to be secured to one of said parts, a member adapted to be secured to another part, chain linkage connecting said members, the latter and the linkage being embedded in vibration-dampening insulating material, said linkage being arranged to permit vertical and longitudinal movement between said members while preventing relative lateral movement thereof.

3. A combined insulating and vibration-dampening device for connecting relatively movable parts, comprising a member adapted to be secured to one of said parts, a member adapted to be secured to another part, a plurality of connected series of links joining said members, said links being movable in a single plane only, and vibration-dampening insulating material in which said members and the links are embedded, said material being arranged to effect a dampening action against relative motion of said members.

4. A combined insulating and vibration-dampening device for connecting relatively movable parts, comprising a member adapted to be secured to one of said parts, a member adapted to be secured to another part, chain linkage joining said members, the elements of said linkage being pivotally connected to one another, and a block of resilient material embedding said linkage and said members.

5. A combined insulating and vibration-dampening device for connecting relatively movable parts, comprising a member adapted to be secured to one of said parts, a member adapted to be secured to another part, chain connections joining said members, and resilient material arranged to space said members in a manner to hold said connections normally flexed.

6. A combined insulating and vibration-dampening device for connecting relatively movable parts, comprising a member adapted to be secured to one of said parts, a member adapted to be secured to another part, a pair of oppositely disposed chains joining said members, and resilient material arranged to embed said chains in a manner to hold them normally flexed in opposite directions, said chains permitting relative motion of said members in all directions within a single plane and preventing relative motion of said members in a direction transverse to said plane of motion.

7. A flexible connection comprising a body of elastic material, articulated metallic members embedded in said elastic material and capable of flexing in one plane but incapable of flexing in another plane at right angles to the first mentioned plane, and means secured to said articulated metallic members for attaching the flexible connection to relatively movable parts of a vehicle.

8. A flexible connection comprising a body of elastic material, chains embedded in said body, the chains being flexible in one plane and rigid in a plane at right angles to the first plane, and means associated with the opposite ends of said chains for connecting them respectively to relatively movable parts.

9. A flexible connection comprising a body of elastic material, chains embedded in said body, said chains consisting of laminated units pivotally connected together, and means for connecting said chains by their opposite ends respectively to relatively movable parts.

10. A flexible connection comprising a body of elastic material, chains embedded in said body, said chains consisting of laminated units pivotally connected together, and means for connecting said chains by their opposite ends respectively to relatively movable parts, said means including elements to which said chain ends are pivotally secured.

11. A flexible connection comprising a plurality of chains, means for connecting said chains by their ends respectively to relatively movable parts, and elastic material disposed between said parts and associated with said chains, said chains being arranged to permit free motion of said parts toward each other and limited motion to said parts from normal position in a direction away from each other.

12. A shackle comprising flexible elements, means for connecting said flexible elements by their opposite ends respectively to relatively movable parts, and elastic material interposed between said parts and holding said elements normally flexed.

Signed at Cleveland, county of Cuyahoga, State of Ohio, this thirtieth day of December, 1927.

CURT SAURER.